United States Patent [19]

Smith et al.

[11] 4,120,804
[45] Oct. 17, 1978

[54] ASHLESS OIL DISPERSANTS

[75] Inventors: William L. Smith; Jacqueline S. Kelyman, both of Midland, Mich.; Ladell Jones, Lake Jackson, Tex.

[73] Assignee: The Dow Chemical Company, Midland, Mich.

[21] Appl. No.: 774,821

[22] Filed: Mar. 7, 1977

[51] Int. Cl.² .............................................. C10M 1/32
[52] U.S. Cl. ............................. 252/47.5; 252/51.5 A
[58] Field of Search ........................... 252/51.5 A, 47.5

[56] References Cited
U.S. PATENT DOCUMENTS

| | | | |
|---|---|---|---|
| 3,769,216 | 10/1973 | Gordon et al. | 252/51.5 A X |
| 3,864,268 | 2/1975 | Culbertson et al. | 252/51.5 A X |
| 3,931,024 | 1/1976 | Hu | 252/51.5 A X |

Primary Examiner—Paul F. Shaver
Attorney, Agent, or Firm—L. W. White; J. P. Hill

[57] ABSTRACT

Oil soluble polymers corresponding to the formula

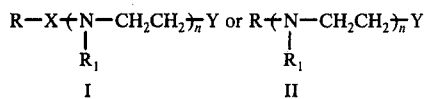

are ashless oil dispersants in lubricating oils and fuels. In formulas I and II, R is a saturated or substantially saturated polyolefin having a molecular weight of at least about 250; $R_1$ is hydrogen or

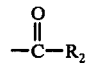

wherein $R_2$ is hydrogen or alkyl of from 1 to about 18 carbon atoms with at least about 60 percent of the $R_1$ groups being

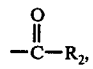

X is

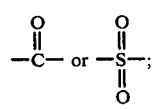

Y is a terminal group; and n is from 2 to about 15.

12 Claims, No Drawings

ASHLESS OIL DISPERSANTS

BACKGROUND OF THE INVENTION

This invention pertains to novel oil-soluble polymers which are useful as ashless oil dispersants in lubricating oils, fuels, hydraulic fluids, etc.

Many patents have issued directed to lubricant and fuel additives commonly referred to as ashless dispersants or detergents. Many of these additives are the reaction products of relatively high molecular weight carboxylic acid acylating agents and amines or alcohols. When employed in lubricating oils, these additives prevent or reduce the formation of sludges, neutralize acidic contaminants, etc. In petroleum based fuels for combustion engines, the additives promote engine fuel system cleanliness, reduce exhaust deposits, etc. The oil-soluble polymers of the present invention can be employed as additives for fuels and lubricating oils in the same general manner as the ashless dispersants described, for example, in U.S. Pat. Nos. 3,172,892; 3,219,666; 3,272,746; 3,341,542; 3,381,022; 3,346,354; 3,347,645; 3,697,428; and 3,948,800 which indicate the state of the art and are incorporated by reference.

SUMMARY OF THE INVENTION

It has now been discovered that oil-soluble polymers corresponding to the formulas

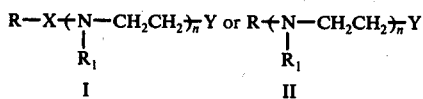

wherein:
(a) R is a saturated or substantially saturated polyolefin having a molecular weight of at least about 250 (preferably from about 500 to about 5000, and more preferably from about 700 to about 3000);
(b) $R_1$ is hydrogen or

wherein $R_2$ is hydrogen or alkyl of from 1 to about 18 carbon atoms with the proviso that at least about 60 percent of the $R_1$ groups are

(preferably all or substantially all of the $R_1$ groups are

and more preferably all of the $R_1$ groups are

wherein $R_2$ is hydrogen or a lower alkyl of 1 to 4 carbon atoms);
(c) X is

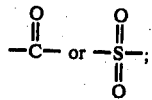

(d) Y is a terminal organic or inorganic group (preferably chloro, bromo, iodo or hydroxy); and
(e) $n$ is an average value of from about 2 to about 15 (preferably from about 3 to about 10).

The polymers represented by formulas I and II are oil-soluble materials which are normally viscous liquids or low melting solids. The compounds are conveniently prepared by reacting a polyolefin bearing a displaceable halo group (e.g., chloro, bromo or iodo) or a polyolefin end capped with a carboxylic or sulfonic acid group, a carboxylic or sulfonic acid halide group, or an anhydride of a dicarboxylic ethylenically unsaturated carboxylic acid (e.g., maleic or succinic acid or anhydride) with an oxazoline or a polyoxazoline corresponding to formulas III and IV, respectively.

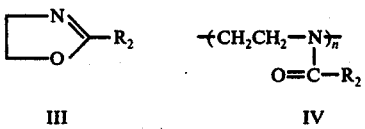

If a polyoxazoline reactant is used, it must be first partially hydrolyzed so that there are secondary amino groups available for reaction with the acylating reagent, displaceable halide, etc. in the hydrophobic polymer reactant.

The reactants used in the above process are known classes of reactants having many members.

The halogenated polyolefins are generally derived from mono-olefins having from 2 to about 30 carbon atoms and can be homopolymers or interpolymers of such alkenes. The polyolefins derived from mono-olefins having less than about 6 carbon atoms are particularly useful. The polyolefins are subsequently halogenated under known conditions with chlorine, bromine and/or iodine to give the halogenated polyolefins which can be used in the above process. Such polymers are described in detail in U.S. Pat. No. 3,444,170 which is incorporated herein by reference. The polyolefin reactants end capped with a carboxylic acid, succinic or maleic acid group are conventionally prepared by reacting a polyolefin (e.g., polyisobutylene) with an α,β-ethylenically unsaturated carboxylic acid or acid anhydride. They can also be prepared by reacting a halogenated polyolefin referred to above with an α,β-ethylenically unsaturated monocarboxylic acid. Such polymers are a well known class, as illustrated by U.S. Pat. Nos. 3,448,048, 3,697,428 and 3,948,800 which are incorporated by reference.

The polyolefins end capped with sulfonic acid or sulfonic acid halide groups are likewise well known and prepared by conventional techniques, as illustrated by U.S. Pat. No. 3,941,834 which is incorporated by reference. The poly-1-butenes and polyisobutylenes are the preferred polyolefins, regardless of the reactive site (that is, halo, carboxylic acid, etc.). Of these, the polyisobutylenes are more preferred and the polyisobutylenes bearing a sulfonyl chloride group are the most preferred.

The oxazolines of formula III and the polymers thereof corresponding to IV are likewise well known. The oxazoline monomers are typically prepared from N-2-hydroxyethyl carboxamides by techniques set forth in the following review articles:

(a) Wiley, et al., *Chemical Reviews,* Volume 44, 447 (1949);
(b) Seeliger, et al., *Angew. Chem. Internat. Edit.,* Volume 5, No. 10 (1966); and
(c) Frump, *Chemical Reviews,* Volume 71, No. 5 (1971).

See also patents classified by the U.S. Patent and Trademark Office under 260/307F. The monomeric oxazolines polymerize in the presence of Lewis acids to form polymers corresponding to IV which are linear N-acylated polyethylenimines. This polymerization is described in U.S. Pat. No. 3,483,141 and in various other references as cited in the review articles. The polyoxazolines (IV) undergo typical acid hydrolysis and must be partially hydrolyzed if they are to be used per se in the above process. The hydrolysis, of course, produces amino sites which are reactive with the acyl groups, etc. in the hydrophobic polymers. The reaction between the hydrophobic polymers bearing halo groups, carboxylic acid groups, etc. with the oxazoline or polyoxazoline reactants is conducted by merely blending the reactants and warming the reaction mixture at an elevated temperature to promote the reaction. Typical reaction temperatures will range from about 50° C. to about 150° C., depending upon the choice of reactants.

The oil-soluble additives of the instant invention are added in small but sufficient amount to impart detergency to lubricating oils and hydrocarbon fuels for internal combustion engines. The lubricating oils are oleaginous materials which include, for example, animal oils and vegetable oils (e.g., castor oil, lard oil, etc.) as well as solvent-refined or acid-refined mineral lubricating oils of the paraffinic, naphthenic, or mixed paraffinic-naphthenic types. Oils of lubricating viscosity derived from coal or shale are also useful base oils. The term lubricating oil also includes synthetic lubricating oils which are hydrocarbon oils and halo-substituted hydrocarbon oils, or esters of dicarboxylic acids, or silicone-based oils, such as those described in U.S. Pat. No. 3,948,800 which is incorporated herewith by reference.

The lubricating oil and fuel compositions comprising the novel ashless dispersants of formulas I and II may also comprise other conventional additives. That is, extreme pressure additives, corrosion inhibiting additives, oxidation inhibiting agents, viscosity control agents, etc.

The following examples will further illustrate the invention.

EXPERIMENTAL

EXAMPLE 1

Polyisobutylene sulfonyl chloride was prepared by reacting polyisobutylene (average molecular weight 920) with chlorosulfonic acid and then treating the reaction mixture with thionyl chloride. Residual hydrochloric acid was removed by vacuum stripping. The polyisobutylene sulfonyl chloride thus produced was blended with 3 equivalents of 2-ethyl-2-oxazoline in a sealed citrate bottle and heated at 90° C. for a period of approximately 8 hours. The functionalized polymer thus produced was isolated as a viscous liquid by dissolving the reaction product in hexane, isolating the hexane layer, and stripping away the hexane under reduced pressure. The isolated product was analyzed by nuclear magnetic resonance spectroscopy to determine the proportion of oxazoline to polyisobutylene and by liquid chromatography to determine the amount of unreacted polyisobutylene. These analytical data showed the reaction product to be the desired grafted "three mer" with three ring-opened oxazoline units attached to the polyisobutylene chain through the

linkage.

The above material was evaluated as an ashless dispersant in a "spot dispersancy test." This test is conducted by adding a quantity of the above polymer to a 5 dram bottle along with 5 grams of a heavily sludged automobile crank case petroleum-based motor oil. The bottle was capped, warmed to 300° F., and shaken for one hour to insure proper dissolution and mixing of the components. The mixture was then heated overnight in a closed container at 320° F. After the heat treatment, the bottle was removed from the oven and allowed to cool to room temperature. Six drops of the oil were dropped onto the center of a 4 inch by 5 inch piece of standard white blotter paper. After 24 hours, the diameter of the sludge spot and oil spot were measured. Dispersancy is reflected by the ability of the oil to keep the sludge in suspension. In this test, dispersancy is reflected by the difference in diameters of the sludge and oil spots.

$$SDT = \frac{\text{Diameter sludge spot}}{\text{Diameter oil spot}} \times 100$$

A heavily sludged oil (with no test additive) will yield a SDT rating of 40 or less. An excellent dispersant will yield SDT ratings of from 70 to 80 when added at a 1-3 percent by weight of the base oil.

In this test method, the above oxazolinated polymer gave SDT ratings of 50.2, 80.1 and 81.7 at additive levels of 1, 2 and 3 percent, respectively.

EXAMPLES 2-3

A polyisobutylene having a molecular weight of 955 was reacted with chlorine to give a monochlorinated polyisobutylene. This material was reacted with a partially hydrolyzed (37 percent) poly-2-ethyl-2-oxazoline having a molecular weight of about 1,300 (this product is hereafter referred to as Example 2). Another aliquot of the chlorinated polyisobutylene was reacted with a partially hydrolyzed (22 percent) poly-2-ethyl-2-oxaxoline having a molecular weight of about 800 (this product is hereafter referred to as Example 3). These products were evaluated along with some commercial standards in the following test procedure:

A sample of 10 W 30 base lubricant oil containing 0.5 weight percent of zinc dialkyldithio phosphate (an antioxidant) and 2.5 weight percent of the test additive was heated for 120 hours at 100° C. Five weight percent of a standard engine sludge was added to the 0, 60, and 120 hour oil samples. After thorough mixing, a very small fraction of the oil sample containing the sludge was placed in a concave microscope slide and heated until the sludge, as observed at 100X magnification, agglomerates to the extent of an area equal to 0.1 millimeters. The temperature at which this phenomenon takes place is the temperature of sludge agglomeration. Knowing the percent drop in sludge agglomeration ($\Delta T$) between 0-60 hours and 60-120 hours, the additive dispersancy performance was determined by means of the equation:

$$X = \tfrac{1}{3}(\%\ \Delta T\ 0\text{-}60\ hrs) + \tfrac{2}{3}(\%\ \Delta T\ 0\text{-}120\ hrs)$$

Samples with only the 10 W 30 lubricant and the standard engine sludge will have an initial sludge agglomeration temperature of approximately 78° C. and a dispersancy rating of C− through C. Two commercial standards (Lubrizol 894 and Chevron Oloa 1200) were evaluated along with Examples 2 and 3 in the data summarized in Table I below.

TABLE I

| Ex | Sludge Agglomeration Temperature (° C) | Dispersancy Performance Rating |
| --- | --- | --- |
| 2 | 245 | A− |
| 3 | 230 | B+ |
| Lubrizol 894 | 226 | B− |
| Chevron Oloa 1200 | 238 | B+ |

These data show the products of Examples 2 and 3 to be very effective ashless oil dispersants.

The products of Examples 2 and 3 also gave ratings between 70 and 80 percent in the spot test detailed in Example 1.

Similar good results can be obtained using other functionalized polyisobutylenes or other polyolefins as set forth above with oxazoline monomers of formula III or with partially hydrolyzed poly-2-alkyl-2-oxazolines of formula IV.

We claim:

1. A lubricating oil or a petroleum-based fuel for a combustion engine comprising a small but sufficient amount to impart detergency of an oil-soluble polymer of the formula

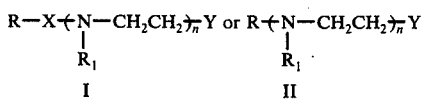

wherein
(a) R is a saturated or substantially saturated polyolefin having a molecular weight of at least about 250;
(b) $R_1$ is hydrogen or

wherein $R_2$ is hydrogen or alkyl of from 1 to about 18 carbon atoms with the proviso that at least about 60 percent of the $R_1$ groups are

(c) X is

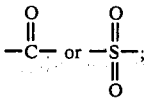

(d) Y is a terminal organic or inorganic group; and
(e) $n$ is an average value of from about 2 to about 15.

2. The composition defined by claim 1 wherein (a) is a poloylefin having a molecular weight of from about 500 to about 5,000.

3. The composition defined by claim 2 wherein said polyolefin has a molecular weight of from about 700 to about 3,000.

4. The composition defined by claim 1 wherein all or substantially all of the $R_1$ groups are

groups.

5. The composition defined by claim 4 wherein $R_2$ is hydrogen or a lower alkyl of from 1 to 4 carbon atoms.

6. The composition defined by claim 1 wherein $n$ is from about 3 to about 10.

7. The composition defined by claim 1 wherein said polyolefin is a poly-1-butene.

8. The composition defined by claim 7 wherein said polyolefin is polyisobutylene.

9. The composition defined by claim 8 wherein X is

and all or substantially all of the $R_1$ groups are

wherein $R_2$ is ethyl, Y is chloro, bromo, iodo or hydroxy, and $n$ is from 3 to about 10.

10. The composition defined by claim 1 wherein said oil-soluble polymer is of formula I.

11. The composition defined by claim 1 prepared by blending and reacting a polyolefin selected from the group consisting of a polyolefin bearing a displaceable halo group; a polyolefin end-capped with a carboxylic acid, sulfonic acid, carboxylic acid halide, sulfonic acid halide, or an anhydride of a dicarboxylic ethylenically unsaturated carboxylic acid; with an oxazoline of the formula

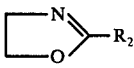

wherein $R_2$ is hydrogen or alkyl of from 1 to about 18 carbon atoms; at temperatures in a range of from about 50° C. to about 150° C.

12. The composition defined by claim 1 prepared by blending and reacting a polyolefin selected from the group consisting of a polyolefin bearing a displaceable halo group; a polyolefin end-capped with carboxylic acid, sulfonic acid, carboxylic acid halide, sulfonic acid halide, or an anhydride of a dicarboxylic ethylenically unsaturated carboxylic acid; with a partially hydrolyzed polyoxazoline of the formula
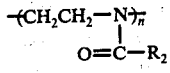
wherein
  $n$ is from 2 to about 15,
  $R_2$ is hydrogen or alkyl of from 1 to about 18 carbon atoms;
at temperatures in a range of from about 50° C. to about 150° C.
* * * * *